(12) United States Patent
Dunning et al.

(10) Patent No.: US 11,466,617 B2
(45) Date of Patent: *Oct. 11, 2022

(54) GAS TURBINE ENGINE WITH EFFICIENT THRUST GENERATION

(71) Applicant: ROLLS-ROYCE plc, London (GB)

(72) Inventors: Pascal Dunning, Derby (GB); Michael J Whittle, Derby (GB); Roderick M Townes, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,328

(22) Filed: Jun. 11, 2021

(65) Prior Publication Data

US 2021/0310408 A1 Oct. 7, 2021

Related U.S. Application Data

(63) Continuation of application No. 16/411,224, filed on May 14, 2019, now Pat. No. 11,047,301.

(30) Foreign Application Priority Data

Aug. 10, 2018 (GB) ...................... 1813086

(51) Int. Cl.
| | | |
|---|---|---|
| *F02C 3/107* | (2006.01) | |
| *F02C 3/073* | (2006.01) | |
| *F02C 7/36* | (2006.01) | |
| *F01D 5/28* | (2006.01) | |

(52) U.S. Cl.
CPC .............. *F02C 3/073* (2013.01); *F01D 5/282* (2013.01); *F02C 3/107* (2013.01); *F02C 7/36* (2013.01); *F05D 2240/12* (2013.01); *F05D 2240/30* (2013.01)

(58) Field of Classification Search
None
See application file for complete search history.

(56) References Cited

U.S. PATENT DOCUMENTS

| | | | |
|---|---|---|---|
| 3,943,703 | A | 3/1976 | Kronogard |
| 5,344,510 | A | 9/1994 | Allen et al. |
| 5,575,147 | A | 11/1996 | Nikkanen |
| 5,780,146 | A | 7/1998 | Mason et al. |
| 6,197,424 | B1 | 3/2001 | Morrison et al. |

(Continued)

FOREIGN PATENT DOCUMENTS

| | | |
|---|---|---|
| EP | 2 184 480 A2 | 5/2010 |
| EP | 3 179 046 A1 | 6/2017 |

(Continued)

OTHER PUBLICATIONS

Guha, Abhijit, "Optimum Fan Pressure Ratio for Bypass Engines with Separate or Mixed Exhaust Streams", 2001, Journal of Propulsion and Power, vol. 17 No. 5. pp. 1117-1122 (Year: 2001).

(Continued)

*Primary Examiner* — Scott J Walthour
(74) *Attorney, Agent, or Firm* — Oliff PLC

(57) ABSTRACT

A highly efficient gas turbine engine includes the fan of the gas turbine engine driven from a turbine via a gearbox, such that the fan has a lower rotational speed than the driving turbine, thereby providing efficiency gains. The efficient fan system is mated to a core that has low cooling flow requirements and/or high temperature capability, and which may have particularly low mass for a given power.

18 Claims, 3 Drawing Sheets

(56) References Cited

U.S. PATENT DOCUMENTS

| | | |
|---|---|---|
| 6,997,673 B2 | 2/2006 | Morris et al. |
| 7,819,625 B2 | 10/2010 | Merrill et al. |
| 8,262,345 B2 | 9/2012 | Andrew |
| 10,047,699 B2 | 8/2018 | Sabnis |
| 10,100,745 B2 | 10/2018 | Schwarz et al. |
| 10,309,232 B2 | 6/2019 | Schwarz et al. |
| 10,400,627 B2 | 9/2019 | Ning et al. |
| 10,794,286 B2 | 10/2020 | Adibhatla |
| 10,794,289 B2 | 10/2020 | Groves, II et al. |
| 2007/0122606 A1 | 5/2007 | Meier et al. |
| 2008/0112798 A1 | 5/2008 | Seitzer et al. |
| 2008/0206046 A1 | 8/2008 | Razzell et al. |
| 2010/0189556 A1 | 7/2010 | Propheter-Hinckley et al. |
| 2011/0088405 A1 | 4/2011 | Turco |
| 2012/0301275 A1 | 11/2012 | Suciu et al. |
| 2012/0301312 A1 | 11/2012 | Berczik et al. |
| 2013/0192266 A1 | 8/2013 | Houston et al. |
| 2013/0224049 A1 | 8/2013 | Schwarz et al. |
| 2013/0327014 A1 | 12/2013 | Moulebhar |
| 2014/0283500 A1 | 9/2014 | Sabnis |
| 2015/0252730 A1 | 9/2015 | Schwarz et al. |
| 2015/0308353 A1 | 10/2015 | Gardner et al. |
| 2015/0377123 A1 | 12/2015 | Adams et al. |
| 2016/0186583 A1 | 6/2016 | Alvanos |
| 2016/0215645 A1 | 7/2016 | McCaffrey |
| 2016/0215729 A1 | 7/2016 | Sabnis |
| 2016/0290157 A1 | 10/2016 | Ning et al. |
| 2016/0348527 A1 | 12/2016 | Vetters et al. |
| 2016/0363048 A1 | 12/2016 | Razak |
| 2017/0022827 A1 | 1/2017 | Waldman et al. |
| 2017/0022905 A1 | 1/2017 | Orosa et al. |
| 2017/0175675 A1 | 6/2017 | Sabnis |
| 2017/0198911 A1 | 7/2017 | Wang et al. |
| 2018/0119619 A1 | 5/2018 | Watson et al. |
| 2018/0163552 A1 | 6/2018 | Reynolds et al. |
| 2018/0355804 A1 | 12/2018 | Miller et al. |
| 2020/0049063 A1 | 2/2020 | Whittle et al. |

FOREIGN PATENT DOCUMENTS

| | | |
|---|---|---|
| EP | 3 269 965 A1 | 1/2018 |
| EP | 3 354 889 A1 | 8/2018 |
| GB | 2 551 553 A | 12/2017 |
| JP | 2012-251542 A | 12/2012 |
| WO | 2014/055102 A1 | 4/2014 |
| WO | 2014/058453 A1 | 4/2014 |
| WO | 2014/151101 A1 | 9/2014 |
| WO | 2014/197075 A2 | 12/2014 |
| WO | 2018/140138 A1 | 8/2018 |

OTHER PUBLICATIONS

Alison B. Evens, "The Effects of Compressor Seventh-Stage Bleed Air Extraction on Performance of the F100-PW-220 Afterburning Turbofan Engine," Feb. 1991, NASA CR-179447. (Year: 1991).

E. M. Greitzer, "vol. 2: Appendices-Design Methodologies for Aerodynamics, Structures, Weight, and Thermodynamic Cycles Final Report," Mar. 31, 2010, Cooperative Agreement No. NNX08AW63A, Apppendix H: Gas Turbine Engine Weight Estimation (pp. 1-14). (Year: 2010).

Eslam Said Abdelghany, Ahmed F. El-Sayed, Mahmoud A. Fouad and Essam E. Khalil, "Effect of Film colling of HP and IP turbines on Performance of triple Spool Turbofan Engines," Jul. 30, 2012, AIAA 2012-3988, pp. 1-13 (Year: 2012).

Jane's Aero-Engines, Issue Seven, Edited by Bill Gunston, Jane's Information Group Inc., Alexandria, Virginia, 2000, pp. 1-67 and 464-512. (Year: 2000).

Wilfert, Gunter, "Geared Fan", Aero-Engine Design: From State of the Art Turbofans Towards Innovative Architectures, von Karman Institute for Fluid Dynamics, Belgium, Mar. 3-7, 2008, pp. 1-26. (Year: 2008).

Halliwell, Ian "An Ultra-High Bypass Ratio Turbofan Engine for the Future", American Institute of Aeronautics and Astronautics (AIAA) Undergraduate Team—Engine Student Design Competition 2014/2015, Sep. 13, 2014, pp. 1-40. (Year: 2014).

Read, Bill, "Powerplant Revolution", AeroSpace, May 2014, pp. 28-31. (Year: 2014).

Radome—Intelligence/Analysis/Comment, AeroSpace, Jul. 2015, pp. 4-5. (Year: 2015).

Wemming, H., "Validation and Integration of a Rubber Engine Model into an MOO Environment", Linkoping University, Sweden, 2010, pp. 1-90. (Year: 2010).

Oates, Gordon C., Aerothermodynamics of gas turbine and rocket propulsion / Gordon C. Gates.—3rd ed., ISBN 1-56347-241-4, Copyright Ó 1997 by the American Institute of Aeronautics and Astronautics, Inc., Ch. 7, pp. 231-275 (Year: 1997).

K. H. Liew, E. Urip, and S.L. Yang, Parametric Cycle Analysis of a Turbofan Engine with an Interstage Turbine Burner, Journal of Propulsion and Power, vol. 21, No. 3, May-Jun. 2005 (Year: 2005).

Eslam Said Abdelghany, Ahmed F. El-Sayed, Essam E. Khalil, "Effect of Bleed air on Performance of Turbofan Engines," AIAA 2013-0598, Jan. 2013 (Year: 2013).

Wendus, Bruce E. et al., "Follow-On Technology Requirement Study for Advanced Subsonic Transport," NASA/CR-2003 212467, (Year: 2003).

Al-Luhaibi, Amjed Ahmed Jasim et al., "Thermal Analysis of Cooling Effect On Gas Turbine Blade", IJRET: International Journal of Research in Engineering and Technology, vol. 3, Issue 31, (Mar. 2014), pp. 603-610.

Wenglarz, R. et al., "Ceramics for ATS Industrial Turbines", Presented at the International Gas Turbine and iteroengine Congress & Exhibition, Birmingham, UK, (Jun. 10-13, 1996).

Gavaghan, Helen, "The High Flying Sell-off", New Scientist, May 7, 1987, pp. 52-54. (Year: 1987).

Soares, Claire, "Gas Turbines A Handbook of Air, Land and Sea Applications", Butterworth-Heinemann, an imprint of Elsevier Inc., 2008, pp. 398-400. (Year: 2008).

Hepher, T., "The 'great engine game' behind new Boeing jet project", Reuters, Feb. 19, 2016. (Year: 2016).

Hall, C.A., and Crichton, D., "Engine Design Studies for a Silent Aircraft", Journal of Turbomachinery, vol. 129, Jul. 2007, pp. 479-487 (paper presented at ASME Turbo Expo 2006: Power for Land, Sea, and Air, GT2006-90559, Barcelona, Spain, May 8-11, 2006, pp. 1653-1662). (Year: 2006).

"GE integrates ceramic matrix composites in LEAP engine", Design Engineering, Jan. 4, 2017. (Year: 2017).

CFM56—Wikipedia Webpage [//en.wikipedia.org/wiki/CFM_International_CFM56, accessed on Jul. 2, 2020]. (Year: 2020).

GE90—Wikipedia Webpage [//en.wikipedia.org/wiki/General_Electric_GE90, accessed on Jul. 2, 2020]. (Year: 2020).

Bjorn Fehrm, "Fundamentals of airliner performance, Part 6; the engine", Leeham News and Analysis, Jan. 19, 2015, [ // leehamnews.com/2015/01/19/fundamentals-of-airliner-performance-part-6-the-engine/ accessed on Oct. 23, 2020], pp. 1-19. (Year: 2015).

Peter Coy, "The Little Gear That Could Reshape the Jet Engine", Bloomberg Business, Oct. 15, 2015 [accessed on Nov. 10, 2015 at http://www.bloomberg.com/news/articles/2015-10-15/pratt-s-purepower-gtf-jet-engine-innovation-took-almost-30-years], (Year: 2015).

PW4000 Wikipedia webpage [https://en.wikipedia.org/wiki/Pratt_%26_Whitney_PW4000 accessed on Oct. 23, 2020], pp. 1-4. (Year: 2020).

Gunter et al—New Environmental Friendly Aero Engine Core Concepts (Year: 2007).

Lei et al—Optimization Study of an Intercooled Recuperated Aero-Engine (Year: 2013).

Xin—Aero Engine Intercooling (Year: 2016).

Philip P. Walsh and Paul Fletcher, "Gas Turbine Performance," 2nd Ed, by Blackwell Science Ltd, 2004, pp. 202-203 (Year: 2004).

J. H. Horlock, D. T. Watson, T. V. Jones, "Limitations on Gas Turbine Performance Imposed by Large Turbine Cooling Flows," Journal of Engineering for Gas Turbines and Power, Jul. 2001, vol. 123, pp. 487-494. (Year: 2001).

"CMCs will revolutionize aero and land-based gas turbines", Turbomachinery International, Nov. 5, 2015. (Year: 2015).

(56) References Cited

OTHER PUBLICATIONS

"GE Successfully Tests World's First Rotating Ceramic Matrix Composite Material for Next-Gen Combat Engine", GE Aviation, Feb. 10, 2015. (Year: 2015).
A J B Jackson, "Optimisation of Aero and Industrial Gas Turbine Design for the Environment," Cranfield University School of Engineering PhD Thesis, 2009. (Year: 2009).
Joachim Kurzke, "Fundamental Differences Between Conventional and Geared Turbofans," Conference Paper Jan. 2009 (Year: 2009).
Mark H. Waters and Edward T. Schairer, "Analysis of Turbofan Propulsion System Weight and Dimensions,"NASA TM X-73,199, Jan. 1977. (Year: 1977).
Philip G. Hill and Carl R. Peterson, "Mechanics and Thermodynamics of Propulsion," Copyright © 1992 by Addison-Wesley Publishing Company, Inc., pp. 400-401. (Year: 1992).
Langenbrunner et al., "Dynamic Response of a Metal and a CMC Turbine Blade during a Controlled Rub Event using a Segmented Shroud", GT2014-27156, Proceedings of ASME Turbo Expo 2014: Turbine Technical Conference and Exposition, Dusseldorf, Germany, Jun. 16-20, 2014, pp. 1-9. (Year: 2014).
"Paris Air Show 2013: A century of aircraft progress", CompositesWorld, Sep. 2, 2013, [https://www.compositesworld.com/articles/paris-air-show-20 13-a-century-of-aircraft-progress accessed on Jun. 21, 2021] (Year: 2013).
Shyam, V. et al., "Real-Time Closed Loop Modulated Turbine Cooling," NASA Aeronautics Research Mission Directorate (ARMD), 2014 Seedling Technical Seminar, Feb. 19-27, 2014 (35 pgs.). (Year: 2014).
Philip P. Walsh and Paul Fletcher, "Gas Turbine Performance," Second Edition, Chapters 1, 5 and 6, Copy Right 1998, 2004 by Blackwell Science, Ltd. (Year 2004).

GAS TURBINE ENGINE WITH EFFICIENT THRUST GENERATION

This is a Continuation of application Ser. No. 16/411,224 filed May 14, 2019, which in turn claims priority to British Application No. 1813086.4 filed Aug. 10, 2018. The entire disclosures of the prior applications are hereby incorporated by reference herein their entirety.

The present disclosure relates to an efficient gas turbine engine. Aspects of the present disclosure relate to a gas turbine having a fan driven via a gearbox and a highly efficient engine core.

The design of a gas turbine engine must balance a number of competing factors. In general, it is desirable to minimize fuel burn and weight. However, gas turbine engines have been used and developed for many years, and so the underlying designs are mature. This high level of design maturity means that advances in, for example, the reduction of fuel burn and/or weight have been relatively small and incremental over recent years.

It is desirable to improve the rate of development of gas turbine engines.

According to an aspect, there is provided a gas turbine engine for an aircraft comprising:
an engine core comprising:
a first turbine, a first compressor, and a first core shaft connecting the first turbine to the first compressor;
a second turbine, a second compressor, and a second core shaft connecting the second turbine to the second compressor, the second turbine, second compressor, and second core shaft being arranged to rotate at a higher rotational speed than the first core shaft, the gas turbine engine further comprising:
a fan comprising a plurality of fan blades; and
a gearbox that receives an input from the first core shaft (26) and outputs drive to the fan so as to drive the fan at a lower rotational speed than the first core shaft, wherein:
a turbine entry temperature ($T0_{turb\_in}$) is defined as the temperature (K) at the inlet to the most axially upstream turbine rotor in the gas turbine engine at a maximum power condition of the gas turbine engine;

$$a\text{ core size is defined as } CS = Wcomp_{in} \cdot \frac{\sqrt{T0comp\_out}}{P0comp\_out}$$

where:
Wcomp_in is the mass flow rate (kg/s) at entry to the engine core;
T0comp_out is the stagnation temperature at exit to the compressor;
P0comp_out is the stagnation pressure at exit to the compressor; and
a thrust to core efficiency ratio TC is at least $1.5 \times 10^7$ kNkg$^{-1}$sPa, where the thrust to core efficiency ratio is defined as $$TC = (\text{Max Net Thrust at Sea Level}) \cdot \frac{\sqrt{T0turb\_in}}{CS}.$$

Wcomp_in may be described as being the mass flow rate at entry to the first compressor. T0comp_out may be described as being the stagnation temperature at exit to the second compressor. P0comp_out may be described as being the stagnation temperature at exit to the second compressor.

The thrust to core efficiency ratio TC may be in a range having a lower bound of $1.5 \times 10^7$, $1.6 \times 10^7$, $1.7 \times 10^7$, $1.8 \times 10^7$, $1.9 \times 10^7$ or $2 \times 10^7$ kNkg$^{-1}$sPa and an upper bound of 3 kNkg$^{-1}$sPa, $3.5 \times 10^7$ kNkg$^{-1}$sPa or 4 kNkg$^{-1}$sPa.

The present inventors have found that providing a gas turbine engine with a thrust to core efficiency ratio in the ranges defined herein—which is higher than conventional engines—may provide a particularly efficient gas turbine engine.

Purely by way of example, one way of achieving such a thrust to core efficiency ratio is through the optimal use of ceramic matrix composites in a gas turbine engine having a fan which is driven from a turbine via a reduction gearbox.

The first and/or second turbine may comprise at least one ceramic matrix composite component. The second turbine may comprise at least one ceramic matrix composite component, which may be in the range of from 2% to 15% of the total mass of the second turbine.

Conventionally, components in a turbine section of a gas turbine engine have been manufactured using a metal alloy, such as a nickel alloy. However, in order to achieve greater engine efficiency, it has been found to be desirable to increase the temperature of the core gas flow entering into the turbine from the combustor. Typically, in operation, the temperature of the gas flowing past some of the components in the turbine is near to or above the melting point of those components. Thus, in order to ensure that such components have sufficient operating life, they require significant cooling. Such cooling is typically provided using air from the compressor that bypasses the combustor. The cooling flow that bypasses the combustor results in reduced engine efficiency, because that flow is simply compressed in the compressor and then expanded through the turbine.

Furthermore, in order to minimize the amount of cooling flow that is used, and thus minimize the impact on engine efficiency, the cooling flow must be used as efficiently as possible. For example, the cooling passages used to cool such turbine components are typically intricate, requiring extensive design and complex manufacturing techniques. This significantly increases the cost of the gas turbine engine.

Still further, the cooling system itself adds mass to the engine.

Selective use of ceramic matrix composites (CMCs) in its turbine may be advantageous. For example, CMC use may not actually be appropriate in all areas. Through this understanding, the inventors have derived the optimum level of CMC use in the turbine to be in the claimed ranges. For example, whilst the thermal capability of CMCs—which is typically higher than their metallic counterparts—may lend itself to use in some areas, the reduced thermal conductivity of CMCs (compared to an equivalent metallic component) means that they may not be suitable in some other areas. Purely by way of non-limitative example, the very hottest parts of the turbine may experience temperatures that exceed even the capability of CMCs, and thus still require a degree of cooling flow. In such a case, it may be more appropriate to use a metal than a CMC, due to the greater thermal conductivity of metals potentially improving the effectiveness of the cooling flow in removing heat from the component.

Purely by way of example, where used, the CMC may be SiC—SiC (i.e. silicon carbide fibres in a silicon carbide matrix). However, it will be appreciated that any suitable CMC may be used, and indeed the turbine may comprise more than one composition of CMC (for example having different elements). Any suitable manufacturing method may be used for the CMC, such as a vapour deposition process or a vapour infusion process.

The turbine may comprise stator vanes, rotor blades, seal segments (which together may be said to form a generally annular ring radially outside the rotor blades), rotor discs (on which rotor blades are provided), one or more radially inner casing elements and one or more radially outer casing elements. The turbine mass may be the total mass of all such turbine components.

In arrangements including CMCs, the minimum mass of ceramic matrix composite in the second turbine may be 1%, 2%, 3%, 4%, 5%, 6%, 7%, 8%, 9% or 10% of the total mass of the second turbine. The maximum mass of ceramic matrix composite in the second turbine may be 20%, 15%, 14%, 13%, 12%, 11%, 10%, 9%, 8%, 7%, 6% or 5% of the total mass of the second turbine. The mass of ceramic matrix composite in the second turbine as a percentage of the total mass of the second turbine may be in a range having any of the minimum percentages listed above as a lower bound and any compatible maximum percentage listed above as an upper bound.

The second turbine may be said to be axially upstream of the first turbine. The first turbine may comprise at least one ceramic matrix composite component. In arrangements including CMCs, the mass of ceramic matrix composite in the first and second turbines may be in the range of from 1% to 15%, optionally 2% to 12%, of the total mass of the first and second turbines.

In arrangements including CMCs, the minimum mass of ceramic matrix composite in the first and second turbines may be 1%, 2%, 3%, 4%, 5%, 6%, 7%, 8%, 9% or 10% of the total mass of the first and second turbines. In arrangements including CMCs, the maximum mass of ceramic matrix composite in the first and second turbines may be 20%, 15%, 14%, 13%, 12%, 11%, 10%, 9%, 8%, 7%, 6% or 5% of the total mass of the first and second turbine. The mass of ceramic matrix composite in the first and second turbines as a percentage of the total mass of the first and second turbines may be in a range having any of the minimum percentages listed above as a lower bound and any compatible maximum percentage listed above as an upper bound.

As noted above, the percentages of CMCs used in the turbine described and claimed herein are based on insight into the most appropriate components for which to use CMCs, taking into account, inter alia, the temperature variation though the turbine. Non-limitative examples are provided below of metallic and CMC components in the gas turbine engine The turbine may comprise at least one row of stator vanes. The most axially upstream row of stator vanes may be metallic. Alternatively, the most axially upstream row of stator vanes may be CMC. The most axially upstream row of stator vanes may be directly downstream of the combustor. For example, there may be no rotor blades between the combustor and the stator vanes.

The terms "upstream" and "downstream" are used herein in the conventional manner, i.e. with respect to the flow through the engine in normal use. Thus, for example, the compressor and combustor are in the upstream direction relative to the turbine.

The turbine may comprise at least one row of rotor blades. The most axially upstream row of rotor blades may be metallic. Alternatively, the most axially upstream row of rotor blades may be CMC. The most axially upstream row of rotor blades may be directly downstream of the most axially upstream row of stator vanes.

The most axially upstream row of rotor blades and/or the most axially upstream row of stator vanes may comprise one or more internal cooling passages and/or film cooling holes, for example where the blades and/or vanes are metallic. Such internal cooling passages and/or film cooling holes may be supplied with cooling flow from the compressor that has bypassed the combustor.

A CMC component may or may not be provided with internal cooling passages and/or film cooling holes.

The most axially upstream row of rotor blades in the turbine may be a part of the second turbine. The most axially upstream row of stator vanes in the turbine may be a part of the second turbine.

The most axially upstream row of rotor blades in the turbine may be radially surrounded by seal segments. Such seal segments may comprise a ceramic matrix composite.

In general, the seal segments may form the radially outer boundary (which may be annular and/or frusto-conical) inside which the turbine blades rotate in use. The radially outer tips of the turbine blades may be adjacent the radially inner surface of the seal segments.

The turbine may comprise at least two rows of stator vanes. The second most axially upstream row of stator vanes (which may be directly axially downstream of the upstream most row of rotor blades) may comprise a ceramic matrix composite.

The turbine may comprise at least two rows of rotor blades. The second most axially upstream row of rotor blades may comprise a ceramic matrix composite.

The second most axially upstream row of rotor blades in the turbine may be a part of the second turbine. The second most axially upstream row of stator vanes in the turbine may be a part of the second turbine.

The second most axially upstream row of rotor blades may be radially surrounded by ceramic matrix composite seal segments.

The second turbine may comprise any number of stator vane rows (for example 1, 2, 3, 4, 5 or 6), and one or more of which may comprise a ceramic matrix composite. The second turbine may comprise any number of rotor blade rows and/or surrounding seal segments (for example 1, 2, 3, 4, 5 or 6), and one or more of which may comprise a ceramic matrix composite.

The axially most upstream row of stator vanes in the first turbine (which may be directly downstream of the axially most downstream row of rotor blades in the second turbine) may comprise a ceramic matrix composite.

The axially most upstream row of rotor blades in the first turbine may comprise a ceramic matrix composite. The axially most upstream row of rotor blades in the first turbine may be surrounded by ceramic matrix composite seal segments.

In any aspect of the present disclosure, any one or more rotor blade, stator vane or seal segment (i.e. seal portion that forms at least a part of the radially outer flow path around a row of rotor blades) that experiences a maximum temperature a maximum power condition at which the engine is certified (which may be commonly known as the "red-line" condition) in the range of from 1300K to 2200K—for example in a range having a lower bound of 1300K, 1400K or 1500K and an upper bound of 1900K, 2000K, 2100K or 2200K—may be manufactured using a CMC. In some arrangements, most, or even all, rotor blades experiencing "red-line" temperatures within such ranges may be manufactured using a CMC. In some arrangements, most, or even all, stator vanes experiencing "red-line" temperatures within such ranges may be manufactured using a CMC. In some arrangements, most, or even all, seal segments experiencing "red-line" temperatures within such ranges may be manufactured using a CMC. Rotor blades, stator vanes and seal segments that do not experience "red-line" temperatures in such ranges may be manufactured using a metal, such as a nickel alloy.

According to an aspect there is provided gas turbine engine for an aircraft comprising:
an engine core comprising:
a turbine, a combustor, and a compressor, the turbine comprising a first turbine and a second turbine and the compressor comprising a first compressor and a second compressor;
a first core shaft connecting the first turbine to the first compressor;
a second core shaft connecting the second turbine to the second compressor, the second turbine, second compressor, and second core shaft being arranged to rotate at a higher rotational speed than the first core shaft, the gas turbine engine further comprising:
a fan comprising a plurality of fan blades; and
a gearbox that receives an input from the first core shaft and outputs drive to the fan so as to drive the fan at a lower rotational speed than the first core shaft, wherein:
the second turbine comprises at least one ceramic matrix composite component; and
the mass of ceramic matrix composite in the second turbine is in the range of from 2% to 15% of the total mass of the second turbine.

According to an aspect, there is provided a gas turbine engine for an aircraft comprising:
an engine core comprising:
a turbine, a compressor, and a combustor;
a fan comprising a plurality of fan blades; and
a gearbox that receives an input from the at least a part of the turbine and outputs drive to the fan so as to drive the fan at a lower rotational speed than the first core shaft, wherein:
the turbine comprises at least one ceramic matrix composite component; and
the mass of ceramic matrix composite in the turbine is in the range of from 1% to 15% of the total mass of the turbine, for example in the range of from 2% to 15%.

According to an aspect, there is provided a gas turbine engine for an aircraft comprising:
an engine core comprising:
a turbine, a combustor, and a compressor, the turbine comprising a first turbine and a second turbine and the compressor comprising a first compressor and a second compressor;
a first core shaft connecting the first turbine to the first compressor;
a second core shaft connecting the second turbine to the second compressor, the second turbine, second compressor, and second core shaft being arranged to rotate at a higher rotational speed than the first core shaft, the gas turbine engine further comprising:
a bypass duct radially outside the engine core;
a fan comprising a plurality of fan blades; and
a gearbox that receives an input from the first core shaft (26) and outputs drive to the fan so as to drive the fan at a lower rotational speed than the first core shaft, wherein:
part of the flow that enters the engine core bypasses the combustor and is used as turbine cooling flow to cool the turbine;
the fan diameter is greater than 225 cm and/or the turbine entry temperature, defined as the temperature at the inlet to the most axially upstream turbine rotor at a maximum power condition of the gas turbine engine, is greater than 1800K; and at cruise conditions, the cooling to bypass flow efficiency ratio is less than 0.02.

The cooling to bypass efficiency ratio may be in the range of from 0.005 to 0.02. The cooling to bypass efficiency ratio may be in a range having a lower bound of 0.005, 0.006, 0.007 or 0.008, and an upper bound of 0.012, 0.013, 0.014, 0.015, 0.016, 0.017, 0.018, 0.019 or 0.02.

The cooling to bypass efficiency ratio may be defined as the ratio of the mass flow rate of the turbine cooling flow to the mass flow rate of the bypass flow at engine. The ratio may be defined at engine cruise conditions.

Such a cooling to bypass efficiency ratio—which is lower than conventional engines—may provide a particularly efficient gas turbine engine.

According to an aspect, there is provided a gas turbine engine for an aircraft comprising:
an engine core comprising:
a first turbine, a first compressor, and a first core shaft connecting the first turbine to the first compressor;
a second turbine, a second compressor, and a second core shaft connecting the second turbine to the second compressor, the second turbine, second compressor, and second core shaft being arranged to rotate at a higher rotational speed than the first core shaft; the gas turbine engine further comprising:
a fan comprising a plurality of fan blades; and
a gearbox that receives an input from the first core shaft and outputs drive to the fan so as to drive the fan at a lower rotational speed than the first core shaft, wherein:
the total mass of the turbine is no greater than 17% of the total dry mass of the gas turbine engine.

The total mass of the turbine may be the mass of the first turbine plus the mass of the second turbine, for example where there are no further turbines in the engine.

The total mass of the turbine as a percentage of the total dry mass of the gas turbine engine may be in a range having a lower bound of 7%, 8%, 9% or 10%, and an upper bound of 13%, 14%, 15%, 16% or 17%.

The mass of the second turbine may be no greater than 7%, 8% or 9% of the total dry mass of the gas turbine engine.

The mass of the second turbine as a percentage of the total dry mass of the gas turbine engine may be in a range having a lower bound of 3%, 4% or 5% and an upper bound of 7%, 8% or 9%.

The total dry mass of the gas turbine engine may be defined as being the mass of the entire gas turbine engine prior excluding fluids (such as oil and fuel) prior to installation onto an aircraft, i.e. not including installation features, such as a pylon or a nacelle.

Providing a gas turbine engine with a turbine mass in the ranges defined herein—which is lower than conventional engines having a fan which is driven from a turbine via a reduction gearbox—may provide a particularly efficient gas turbine engine.

According to an aspect, there is provided a gas turbine engine for an aircraft comprising:
an engine core comprising:
a first turbine, a first compressor, and a first core shaft connecting the first turbine to the first compressor;
a second turbine, a second compressor, and a second core shaft connecting the second turbine to the second compressor, the second turbine, second compressor, and second core shaft being arranged to rotate at a higher rotational speed than the first core shaft, the gas turbine engine further comprising:

a fan comprising a plurality of fan blades; and a gearbox that receives an input from the first core shaft and outputs drive to the fan so as to drive the fan at a lower rotational speed than the first core shaft, wherein:

the maximum net thrust of the engine at sea level is at least 160 kN; and the normalized thrust is in the range of from 0.25 to 0.5 kN/kg.

The normalized thrust may be defined as the maximum net thrust (in kN) of the engine at sea level divided by the total mass of the turbine. The total mass of the turbine may be the total mass of the first turbine and the second turbine, for example where there are no further turbines in the engine.

The normalized thrust may be in a range having a lower bound of 0.2, 0.25 or 0.3 kN/kg and an upper bound of 0.45, 0.5 or 0.55 kN/kg.

Providing a gas turbine engine with a normalized thrust in the ranges defined herein—which is higher than conventional engines—may provide a particularly efficient gas turbine engine.

According to an aspect, there is provided a gas turbine engine for an aircraft comprising:

an engine core comprising:

a first turbine, a first compressor, and a first core shaft connecting the first turbine to the first compressor;

a second turbine, a second compressor, and a second core shaft connecting the second turbine to the second compressor, the second turbine, second compressor, and second core shaft being arranged to rotate at a higher rotational speed than the first core shaft, the gas turbine engine further comprising:

a fan comprising a plurality of fan blades; and a gearbox that receives an input from the first core shaft and outputs drive to the fan so as to drive the fan at a lower rotational speed than the first core shaft, wherein:

part of the flow that enters the engine core bypasses the combustor and is used as turbine cooling flow to cool the turbine;

a cooling flow requirement is defined as the ratio of the mass flow rate of the turbine cooling flow to the mass flow rate of the flow entering the engine core (B) at cruise conditions;

a turbine entry temperature is defined as the temperature (K) at the inlet to the most axially upstream turbine rotor in the gas turbine engine at a maximum power condition of the gas turbine engine; and the cooling efficiency ratio, defined as the ratio between the turbine entry temperature and the cooling flow requirement, is in the range of from 8000 to 20000 K.

The cooling efficiency ratio may be in a range having a lower bound of 8000, 9000 or 10000K, and an upper bound of 18000, 20000 or 22000.

Providing a gas turbine engine with a cooling efficiency ratio in the ranges defined herein—which is higher than conventional engines—may provide a particularly efficient gas turbine engine.

According to an aspect, there is provided a gas turbine engine for an aircraft comprising:

an engine core comprising a turbine, a compressor, and a core shaft connecting the turbine to the compressor;

a fan comprising a plurality of fan blades; and a gearbox that receives an input from the core shaft and outputs drive to the fan so as to drive the fan at a lower rotational speed than the core shaft, wherein:

at a maximum power condition, the ratio of the turbine entry temperature (K) to the fan speed in rpm is at least 0.7 K/rpm.

The maximum power condition may correspond to the "red-line" condition defined elsewhere herein.

The ratio of the turbine entry temperature (K) to the fan speed in rpm may be in a range having a lower bound of 0.7, 0.8 or 0.9 and an upper bound of 1.5, 1.6, 1.7, 1.8, 1.9 or 2.

Providing a gas turbine engine with a ratio of the turbine entry temperature (K) to the fan speed in rpm in the ranges defined herein—which is higher than conventional engines—may provide a particularly efficient gas turbine engine.

According to an aspect, there is provided a gas turbine engine for an aircraft comprising:

an engine core comprising:

a first turbine, a first compressor, and a first core shaft connecting the first turbine to the first compressor;

a second turbine, a second compressor, and a second core shaft connecting the second turbine to the second compressor, the second turbine, second compressor, and second core shaft being arranged to rotate at a higher rotational speed than the first core shaft, the gas turbine engine further comprising:

a fan comprising a plurality of fan blades; and a gearbox that receives an input from the first core shaft (26) and outputs drive to the fan so as to drive the fan at a lower rotational speed than the first core shaft, wherein:

a turbine entry temperature ($T0_{turb\_in}$) is defined as the temperature (K) at the inlet to the most axially upstream turbine rotor in the gas turbine engine at a maximum power condition of the gas turbine engine;

$$a\ core\ size\ is\ defined\ as\ CS = Wcomp_{in} \cdot \frac{\sqrt{T0comp\_out}}{P0comp\_out}$$

where:

Wcomp_in is the mass flow rate (kg/s) at entry to the engine core;

T0comp_out is the stagnation temperature at exit to the compressor;

P0comp_out is the stagnation pressure at exit to the compressor; and a fan to core efficiency ratio FC is at least $1.9 \times 10^5$ mkg$^{-1}$sPa, where the fan to core efficiency ratio is defined as $$FC = (Fan\ Diameter) \cdot \frac{\sqrt{T0turb\_in}}{CS}.$$

Wcomp_in may be described as being the mass flow rate at entry to the first compressor. T0comp_out may be described as being the stagnation temperature at exit to the second compressor. P0comp_out may be described as being the stagnation temperature at exit to the second compressor.

The fan to core efficiency ratio TC may be in a range having a lower bound of $1.9 \times 10^5$, $2 \times 10^5$, or $2.1 \times 10^5$ mkg$^{-1}$sPa and an upper bound of $2.5 \times 10^5$, $3 \times 10^5$, or $3.5 \times 10^5$ mkg$^{-1}$sPa.

Providing a gas turbine engine with a fan to core efficiency ratio in the ranges defined herein—which is higher than conventional engines—may provide a particularly efficient gas turbine engine.

The skilled person will appreciate that except where mutually exclusive, a feature or relationship described in relation to any one of the above aspects may be applied to any other aspect. Furthermore, except where mutually exclusive, any feature or relationship described herein may be applied to any aspect and/or combined with any other feature or relationship described herein.

By way of non-limitative example, any one or more of the following features and/or relationships disclosed herein and listed below in relation to any aspect may be combined independently of any of the other features or relationships and/or included in any other aspect of the invention:

Mass of ceramic matrix composite in the second turbine as a percentage of the total mass of the second turbine Mass of ceramic matrix composite in the turbine as a whole as a percentage of the total mass of the turbine as a whole Turbine entry temperature Cooling to bypass flow efficiency ratio Total mass of the turbine as a percentage of the total dry mass of the gas turbine engine Normalized thrust of the engine Cooling efficiency ratio Ratio of the turbine entry temperature (K) to the fan speed in rpm Thrust to core efficiency ratio TC Fan to core efficiency ratio As used herein, the turbine entry temperature, which may be referred to as TET, may be defined as the maximum temperature at entry to the most axially upstream rotor stage of the turbine measured at a maximum power condition. The maximum power condition may be the maximum power condition at which the engine is certified, and may represent the maximum temperature at that location during operation of the engine. Such a condition is commonly referred to as a "red-line" condition. Such a condition may occur, for example, at a high thrust condition, for example at a maximum take-off (MTO) condition. The TET (which may be referred to as the maximum TET) in use of the engine may be particularly high, for example, at least (or on the order of) any of the following: 1800K, 1850K, 1900K, 1950K, 2000K, 2050K or 2100K. The maximum TET may be in an inclusive range bounded by any two of the values in the previous sentence (i.e. the values may form upper or lower bounds). It will be appreciated that this maximum power condition at which the maximum TET is measured is the same as the condition as that at which the max net thrust at sea level, or maximum thrust, (as referred to anywhere herein) is measured.

As noted elsewhere herein, the present disclosure relates to a gas turbine engine. Such a gas turbine engine may be said to comprise an engine core comprising a turbine, a combustor, a compressor, and a core shaft connecting the turbine to the compressor. Such a gas turbine engine may comprise a fan (having fan blades) located upstream of the engine core.

As noted elsewhere herein, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft that drives the gearbox may be a first turbine, the compressor connected to the core shaft that drives the gearbox may be a first compressor, and the core shaft that drives the gearbox may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4, for example on the order of or at least 3, 3.1, 3.2, 3.3, 3.4, 3.5, 3.6, 3.7, 3.8, 3.9, 4.0, 4.1, or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 225 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches) or 400 cm. The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85.

Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions (and/or maximum take-off conditions) defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions and/or maximum take-off as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise and/or maximum take-off of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
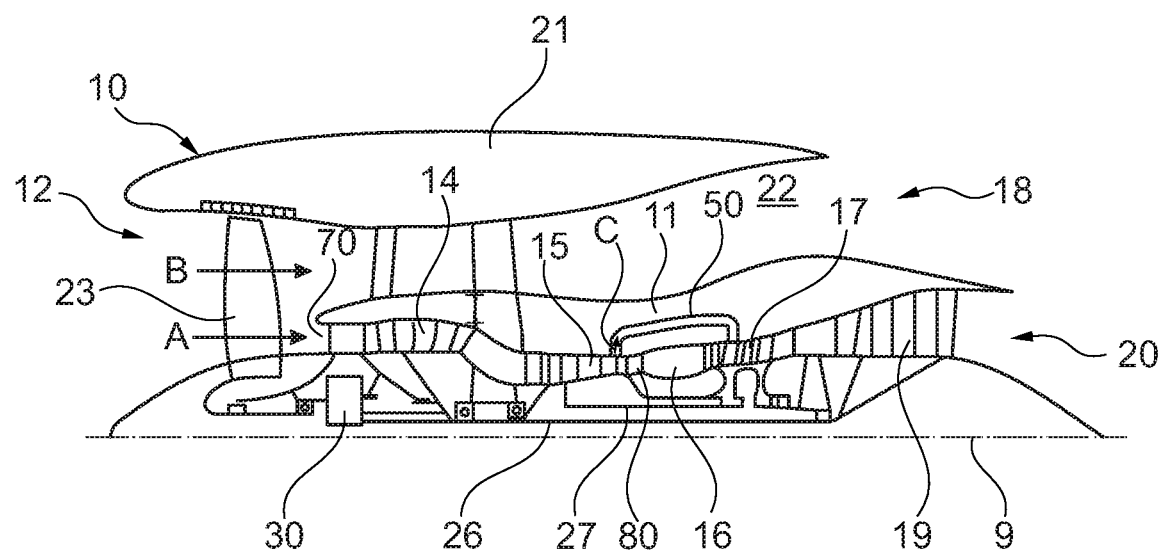
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14 (which may be referred to herein as a first compressor 14), a high-pressure compressor 15 (which may be referred to herein as a second compressor), combustion equipment 16, a high-pressure turbine 17 (which may be referred to herein as a second turbine), a low pressure turbine 19 (which may be referred to herein as a first turbine) and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
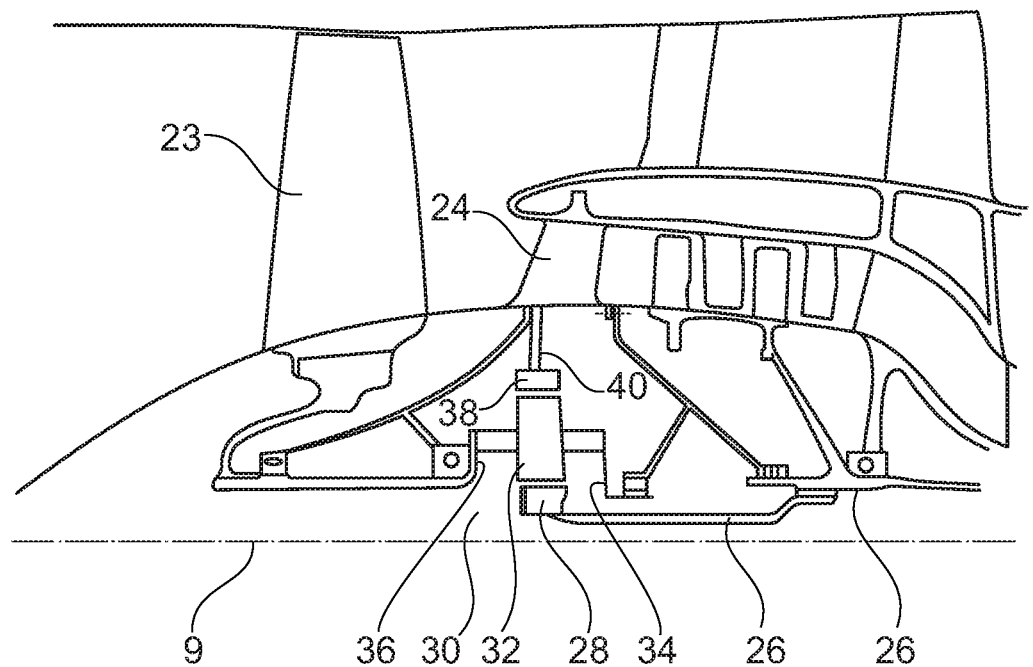
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
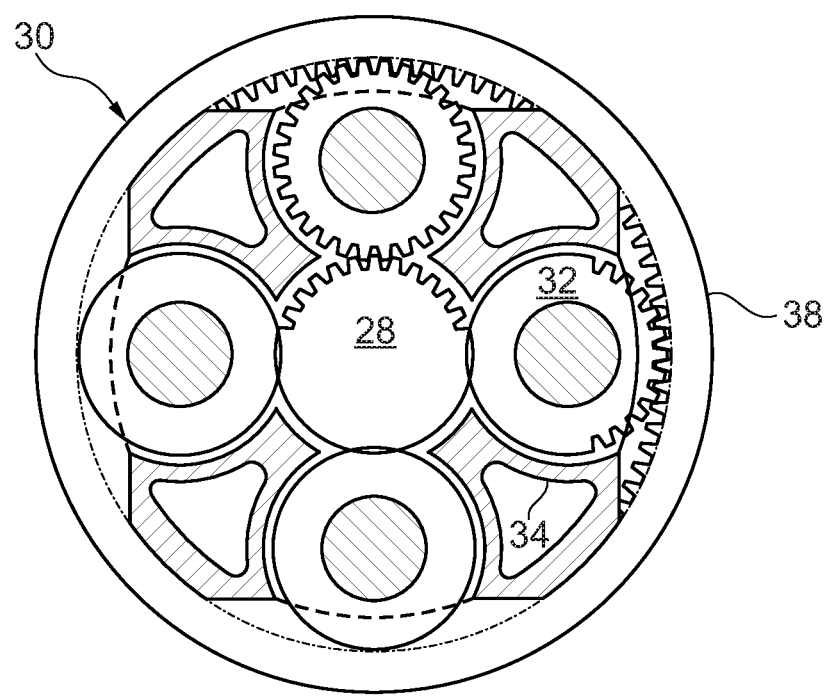
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
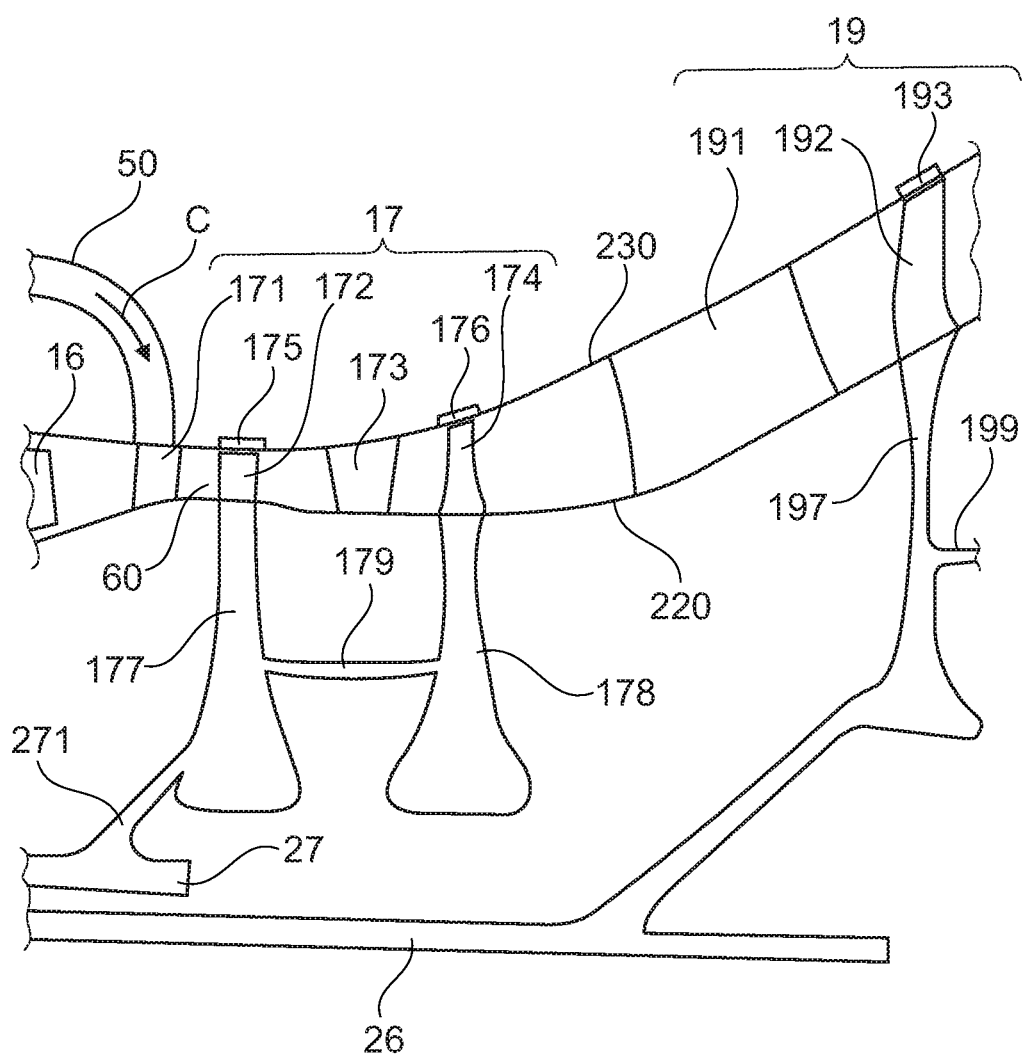
FIG. 4 is a schematic showing an enlarged view of an upstream portion of the turbine of the gas turbine engine.

FIG. 4 shows a part of the turbine in greater detail. In particular, FIG. 4 shows a downstream portion of the combustor 16, the second (high pressure) turbine 17, and an upstream portion of the first (low pressure) turbine 19. The high pressure turbine 17 is connected to the second core shaft 27. The low pressure turbine 19 is connected to the first core shaft 26.

In the illustrated example, the high pressure turbine 17 comprises, in axial-flow series, a first (most axially upstream) stator vane row 171, a first (most axially upstream) rotor blade row 172, a second (second most axially upstream) stator vane row 173, and a second (second most axially upstream) rotor blade row 174.

The first rotor blade row 172 is connected to a rotor disc 177. The second rotor blade row 174 is connected to a rotor disc 178. The two rotor discs 177, 178 are rigidly connected together by a link member 179. At least one of the rotor discs (in the illustrated example the first rotor disc 177) is connected to the second core shaft 27 via an arm 271. Accordingly, in use, the second core shaft 27, rotor discs 177, 178 and rotor blades 172, 174 all rotate together, at the same rotational speed.

The gas turbine engine 10 also comprises seal segments 175 provided radially outside the first rotor blade row 172. The gas turbine engine 10 also comprises seal segments 176 provided radially outside the second rotor blade row 174. The seal segments 175, 176 form the radially outer flow boundary (which may be referred to as the radially outer annulus line) in the region of the respective rotor blade row 172, 174, for example over the axial extent of the tips of the rotor blades 172, 174. The seal segments 175, 176 may form a seal with the tips of the rotor blades to prevent—or at least restrict—flow passing over or past the tips of the rotor blades. The seal segments 175, 176 may be abradable by the rotor blades. Thus, for example, the seal segments 175, 176 may be abraded by the rotor blades in use so as to form an optimal seal therebetween. Each segment may form an annular segment or a frusto-conical segment.

In the illustrated example, the high pressure turbine 17 is a two-stage high pressure turbine, in that it comprises two stages of vanes and blades, each stage comprising a stator vane row followed by a rotor blade row. However, it will be appreciated that gas turbine engines 10 in accordance with the present disclosure may comprise a high pressure turbine with any number of stages, for example 1, 2, 3, 4, 5 or more than 5 stages of stator vanes and rotor blades.

The low pressure turbine 19 is provided downstream of the high pressure turbine 17. An axially most upstream row of stator vanes 191 in the low pressure turbine 19 is provided immediately downstream of the final row of rotor blades 174 of the high pressure turbine 17. An axially most upstream row of rotor blades 192 in the low pressure turbine 19 is provided immediately downstream of the axially most upstream row of stator vanes 191. The axially most upstream row of rotor blades 192 is connected to the first core shaft 26 via a rotor disc. In use, the rotor blades 192 of the low pressure turbine 19 drive the first core shaft 26, which in turn drives the low pressure compressor 14, and also drives—via a gearbox 30—the fan 23.

FIG. 4 only shows an upstream portion of the low pressure turbine 19. However, it will be appreciated that downstream of the illustrated portion there may be provided further rows of stator vanes and rotor blades. For example, the low pressure turbine 19 may comprise 1, 2, 3, 4, 5 or more than 5 stages of stator vanes and rotor blades. The axially most upstream row of rotor blades 192 are connected to one or more (not shown) downstream rotor blade rows via a linkage 199 that is connected to the disc 197 on which the rotor blades 192 are supported.

At least a part of the high pressure turbine 17 and/or the low pressure turbine 19 comprises a CMC in the illustrated example. Purely by way of example, the CMC material may be silicon carbide fibres and/or a silicon carbide matrix (SiC—SiC), although it will be appreciated that other CMCs may be used, such as an oxide-oxide (Ox-Ox CMC material), a monolithic ceramic, and/or the like.

As noted elsewhere herein, CMCs have different properties to conventional turbine materials, such as nickel alloys. For example, CMCs typically have lower density and are able to withstand higher temperatures than metals such as nickel alloys.

The present inventors have understood that these properties can be useful in some areas of the turbine 17, 19, but other properties—such as lower thermal conductivity of CMCs compared to nickel alloys—mean that their use is not appropriate in all areas of the turbine 17, 19.

For example, depending on the type of engine (for example in terms of architecture and/or maximum thrust), any one or more of the first (most axially upstream) stator vane row 171, first (most axially upstream) rotor blade row 172, second (second most axially upstream) stator vane row 173, second (second most axially upstream) rotor blade row 174 and first or second set of seal segments 175, 176 of the high pressure turbine may be manufactured using CMCs. Components in the above list that are not manufactured using CMCs may be manufactured using a metal, such as a nickel alloy. Optionally, in any aspect or arrangement described and/or claimed herein and regardless of the number of stages in the high pressure turbine 17, the rotor blades of each stage in the high pressure turbine 17 may be surrounded by seal segments, and the seal segments surrounding any one or more stage (for example all stages) may be made from a CMC.

Purely by way of non-limitative example, in the FIG. 4 arrangement, the second stator vane row 173, second rotor blade row 174 and first set of seal segments 175 and second set of seal segments 176 of the high pressure turbine are manufactured using CMCs, whereas the first stator vane row 171 and the first rotor blade row 172 are manufactured using a nickel alloy. In this particular example, the temperature experienced by the first stator vane row 171 and the first rotor blade row 172 may be even higher than that which can be tolerated by CMCs. Accordingly, for this particular example, this means that the first stator vane row 171 and the first rotor blade row 172—which experience higher temperatures than downstream components due to their proximity to the combustor exit 16—can take advantage of the relatively high thermal conductivity of the nickel alloy so as to be cooled more effectively using cooling air (taken from the compressor, for example) which may be provided to passages running through the components.

The total mass of the high pressure turbine 17 may include the masses of the stator vanes 171, 173, rotor blades 172, 174, seal segments 175, 176, rotor discs 177, 178, one or more radially inner casing elements that form the inner flow boundary 220 over the axial extent of the high pressure turbine 17, and one or more radially outer casing elements that form the outer flow boundary 230 over the axial extent of the high pressure turbine 17.

CMCs may be used in appropriate parts of the low pressure turbine 19, although in some engines 10 their use in the low pressure turbine 19 may not be appropriate, and thus they may not be used. Purely by way of non-limitative example, in the FIG. 4 arrangement, the axially most upstream row of stator vanes 191 is manufactured using a CMC, whereas the axially most upstream row of rotor blades 192 is manufactured using a metal alloy (such as a nickel alloy). In this particular example, the temperature experienced by the axially most upstream row of rotor blades 192 may not be sufficiently high to benefit from the use of CMCs, although it will be appreciated that in other engines 10 in accordance with the present disclosure, the axially most upstream row of rotor blades 192 and/or the associated seal segments 193 may be manufactured using CMCs. Indeed, in some engines, components (such as vanes, blades and seals) downstream of the axially most upstream row of rotor blades 192 in the low pressure turbine 19 may be manufactured using CMCs.

Any component manufactured using CMCs may also be provided with an environmental barrier coating (EBC). Such an EBC may cover at least the gas washed surface of such components. Such an EBC may protect the CMC from environmental deterioration, for example deterioration due to the effects of water vapour. Such an EBC may be, for example ytterbium disilicate ($Yb_2Si_2O_7$), which may be applied by any suitable method, such as air plasma spray.

As noted elsewhere herein, CMCs have a higher temperature capability than conventional materials, such as metal alloys. This means that selective use of CMCs in the turbine can mean that some components that would need to be cooled if they were to be made from a metal alloy do not need to be cooled because they are made from a CMC and/or some components manufactured using a CMC require less cooling than if they were to be made from a metal alloy. Additionally or alternatively, through use of CMCs it may be possible to expose some components to a higher temperature than would otherwise be possible.

Purely by way of non-limitative example, optimizing the use of CMCs in the engine (for example in one or more components of the turbine 17, 19 as described herein) may reduce the cooling flow C requirement, which may result in a more efficient engine core (because less flow is bypassing the combustor), meaning that for a given amount of core power, the mass flow entering the core can be reduced and/or the size and/or mass of the turbine(s) 17, 19 can be reduced.

FIGS. 1 and 4 schematically show turbine cooling apparatus 50. The turbine cooling apparatus extracts cooling flow C from the compressor 14, 15. The cooling flow C bypasses the combustor 16. The cooling flow C is then delivered to the high pressure turbine 17 and optionally the low pressure turbine 19. Although the turbine cooling apparatus 50 is shown in FIGS. 1 and 4 as extracting cooling flow C from a specific position in the high pressure compressor 15 and delivering it to a specific position in the high pressure turbine 17, it will be appreciated that this is merely for ease of schematic representation, and that the cooling flow C may be extracted from any suitable locations (for example multiple locations in the high pressure compressor 15 and/or the low pressure compressor 14) and delivered to any desired locations (for example multiple locations in the high pressure turbine 17 and/or the low pressure turbine 19).

A reduction in the amount of cooling flow C is desirable, because the cooling flow is not combusted and thus the amount of work that can be extracted from it is lower than for the flow that passes through the combustor 16. With reference to FIG. 1, the gas turbine engine 10 has a bypass ratio defined as the mass flow rate of the flow B through the bypass duct 22 divided by the mass flow rate of the flow A entering the engine core at cruise conditions. As the bypass ratio is increased—for example to increase engine efficiency—proportionally less flow A goes through the core. This means that for a given size of engine and/or to be able to withstand a given turbine entry temperature, a higher proportion of the core flow A may be required to be used as turbine cooling flow C. In this regard, as used herein, turbine entry temperature (T0turb_in) may be the maximum stagnation temperature measured at a position 60 in the gas flow path that is immediately upstream of the most axially upstream rotor blade row 172, i.e. at a so-called "red-line" operating condition of the engine at which the engine is certified.

A cooling to bypass efficiency ratio may be defined as the ratio of the mass flow rate C of the turbine cooling flow to the mass flow rate B of the bypass flow at cruise conditions. Using an understanding of the constraints and/or technologies described by way of example herein, the cooling to bypass efficiency ratio may be optimized to be as described and/or claimed herein. Additionally or alternatively, the mass of the high pressure turbine 17 and/or the low pressure turbine 19 may be optimized (for example reduced) relative to a conventional engine. In turn, this may reduce the mass of the high pressure turbine 17 and/or the low pressure turbine 19 as a proportion of the overall mass of the gas turbine engine 10.

Using an understanding of the constraints and/or technologies described by way of example herein, the normalized thrust may be optimized. In this regard, the normalized thrust is defined as the maximum net thrust of the engine 10 at sea level divided by the total mass of the turbines 17, 19 in the engine 10. The illustrated example has a high pressure turbine 17 and a low pressure turbine 19, however, it will be appreciated that where further turbines are included in the engine the total turbine mass includes the mass of all turbines.

As noted elsewhere herein, the optimized use of CMCs may result in a reduced turbine cooling flow requirement. Additionally or alternatively, through use of CMCs it may be possible to expose some components to a higher temperature than would otherwise be possible. This may result in the ability to increase the turbine entry temperatures relative to engines 10 that do not include optimized use of CMCs. In this regard, it has been found that higher turbine entry temperatures are desirable from an engine efficiency perspective.

Using an understanding of the constraints and/or technologies described by way of example herein, the cooling efficiency ratio may be optimized. In this regard, the cooling efficiency ratio is defined as the ratio between the turbine entry temperature (as defined elsewhere herein) and the cooling flow requirement. The cooling flow requirement may be defined as the mass flow rate of the turbine cooling flow C divided by the mass flow rate of the flow A entering the engine core at cruise conditions.

A core size CS may be defined for the gas turbine engine 10 as:

$$CS = Wcomp_{in} \cdot \frac{\sqrt{T0comp\_out}}{P0comp\_out}$$

where:

Wcomp_in is the mass flow rate (kg/s) at entry to the engine core, i.e. the mass flow rate of the core flow A measured at position 70 in FIG. 1;

T0comp_out is the stagnation temperature (K) at exit to the compressor, i.e. at exit of the highest pressure compressor 15, indicated by position 80 in FIG. 1;

P0comp_out is the stagnation pressure (Pa) at exit to the compressor i.e. at exit of the highest pressure compressor 15, indicated by position 80 in FIG. 1.

Using an understanding of the constraints and/or technologies described by way of example herein may allow a thrust to core efficiency ratio TC and/or a fan to core efficiency ratio FC to be optimised to be in the ranges described and/or claimed herein, where the thrust to core efficiency ratio TC and the fan to core efficiency ratio FC are as defined below (with T0turb_in being the turbine entry temperature at position 60 shown in FIG. 4, as described above).

$$TC = (\text{Max Net Thrust at Sea Level}) \cdot \frac{\sqrt{T0turb\_in}}{CS}$$

$$FC = (\text{Fan Diameter}) \cdot \frac{\sqrt{T0turb\_in}}{CS}$$

It will be appreciated that the understanding and/or technology described and/or claimed herein results in a particularly efficient gas turbine engine 10. For example, the understanding and/or technology described and/or claimed herein may provide a particularly efficient gas turbine engine 10 in which a fan 23 that is driven by a gearbox 30 is complemented by an optimized engine core.

It will be understood that the invention is not limited to the embodiments above-described and various modifications and improvements can be made without departing from the concepts described herein. Except where mutually exclusive, any of the features and aspects may be employed separately or in combination with any other features and the disclosure extends to and includes all combinations and sub-combinations of one or more features described herein.

The invention claimed is:

1. A gas turbine engine for an aircraft, the gas turbine engine comprising:
an engine core comprising:
a first turbine, a first compressor, and a first core shaft connecting the first turbine to the first compressor;
a second turbine, a second compressor, and a second core shaft connecting the second turbine to the second compressor, wherein the second turbine, the second compressor, and the second core shaft are arranged to rotate at a higher rotational speed than a rotational speed of the first core shaft, the second turbine comprising at least one ceramic matrix composite component, and the mass of ceramic matrix composite in the second turbine is in the range of from 2% to 15% of the total mass of the second turbine, the gas turbine engine further comprising:
a fan comprising a plurality of fan blades; and
a gearbox that receives an input from the first core shaft and is configured to drive the fan at a lower rotational speed than the rotational speed of the first core shaft, wherein:
a turbine entry temperature (T0turb_in) is defined as a temperature (K) at an inlet to an axially most upstream turbine rotor in the gas turbine engine;

a core size is defined as $CS = \text{Wcomp\_in} \times \frac{\sqrt{T0comp\_out}}{P0comp\_out}$ where:
Wcomp_in is a mass flow rate (kg/s) at an entry of the engine core;
T0comp_out is a stagnation temperature at an exit of the second compressor;
P0comp_out is a stagnation pressure at the exit of the second compressor; and
the gas turbine engine is configured to exhibit a thrust to core efficiency ratio TC that is in a range of from $1.5 \times 10^7$ kNkg$^{-1}$sPa to $4.0 \times 10^7$ kNkg$^{-1}$sPa, where the thrust to core efficiency ratio is defined as $$TC = (\text{Max Net Thrust at Sea Level}) \times \frac{\sqrt{T0turb\_in}}{CS},$$

wherein T0turb_in, CS, and Max Net Thrust at Sea Level are defined at a maximum power condition of the gas turbine engine, the maximum power condition being a maximum take-off condition at standard atmospheric conditions at sea level plus 15° C.,
the maximum net thrust at sea level is in a range of from 160 kN to 550 kN, and
the turbine entry temperature (T0turb_in) is in a range of from 1800K to 2100K.

2. The gas turbine engine according to claim 1, wherein the thrust to core efficiency ratio (TC) is in a range of from $1.5 \times 10^7$ kNkg$^{-1}$sPa to $3.5 \times 10^7$ kNkg$^{-1}$sPa.

3. The gas turbine engine according to claim 1, wherein the maximum net thrust at sea level is in a range of from 300 kN to 500 kN.

4. The gas turbine engine according to claim 1, wherein the gas turbine engine is configured to exhibit a fan to core efficiency ratio (FC) that is at least $2 \times 10^5$ mkg$^{-1}$sPa, where the fan to core efficiency ratio (FC) is defined as $$FC = (\text{Fan Diameter}) \times \frac{\sqrt{T0turb\_in}}{CS}.$$

5. The gas turbine engine according to claim 1, wherein:
the first turbine comprises at least one ceramic matrix composite component.

6. The gas turbine engine according to claim 1, wherein:
the second turbine comprises at least one row of stator vanes; and
an axially most upstream row of stator vanes of the second turbine are metallic or ceramic matrix composite.

7. The gas turbine engine according to claim 1, wherein:
the second turbine comprises at least one row of rotor blades; and an axially most upstream row of rotor blades of the second turbine are metallic or ceramic matrix composite.

8. The gas turbine engine according to claim 1, wherein:
the second turbine comprises at least one row of rotor blades, an axially most upstream row of rotor blades of the second turbine being radially surrounded by seal segments; and
the seal segments comprise a ceramic matrix composite.

9. The gas turbine engine according to claim 1, wherein:
the second turbine comprises at least two rows of stator vanes; and
a second axially most upstream row of stator vanes of the second turbine comprise a ceramic matrix composite.

10. The gas turbine engine according to claim 1, wherein:
the second turbine comprises at least two rows of rotor blades; and
a second axially most upstream row of rotor blades of the second turbine comprise a ceramic matrix composite.

11. The gas turbine engine according to claim 10, wherein:
the second most axially upstream row of rotor blades is radially surrounded by ceramic matrix composite seal segments.

12. The gas turbine engine according to claim 1, wherein an axially most upstream row of stator vanes in the first turbine comprise a ceramic matrix composite.

13. The gas turbine engine according to claim 1, wherein an axially most upstream row of rotor blades in the first turbine comprise a ceramic matrix composite.

14. The gas turbine engine according to claim 1, wherein the turbine entry temperature (T0turb_in) is in a range of from 1850K to 2050K.

15. The gas turbine engine according to claim 1, wherein the fan diameter is in a range of from 325 cm to 370 cm.

16. The gas turbine engine according to claim 1, wherein a gear reduction ratio of the gearbox is in a range of from 3.3 to 4.

17. The gas turbine engine according to claim 1, wherein the maximum net thrust at sea level is in a range of from 160 kN to 250 kN.

18. The gas turbine engine according to claim 1, wherein the fan diameter is in a range of from 250 cm to 280 cm.

* * * * *